April 13, 1954     P. J. STEWART ET AL     2,675,479

METHOD AND APPARATUS FOR RADIOGRAPHY

Filed June 27, 1952     2 Sheets-Sheet 1

Inventors
PETER J. STEWART
NORMAN Z. ALCOCK
by: Fetherstonhaugh Co.
Att'ys.

April 13, 1954     P. J. STEWART ET AL     2,675,479
METHOD AND APPARATUS FOR RADIOGRAPHY Filed June 27, 1952     2 Sheets-Sheet 2

Inventors
PETER J. STEWART
NORMAN Z. ALCOCK
by: Featherstonhaugh & Co.
Attys.

Patented Apr. 13, 1954

2,675,479

UNITED STATES PATENT OFFICE 2,675,479

METHOD AND APPARATUS FOR RADIOGRAPHY

Peter J. Stewart and Norman Z. Alcock, Oakville, Ontario, Canada, assignors to Isotope Products Limited, Oakville, Ontario, Canada, a company of Ontario, Canada Application June 27, 1952, Serial No. 295,874

10 Claims. (Cl. 250—65)

This invention relates to a method and apparatus for radiography.

This application is a continuation-in-part of application Serial No. 284,848 filed April 28, 1952, for Method and Apparatus for Radiography, also assigned to Isotope Products Limited.

Radioactive isotopes have been employed for gamma radiography heretofore. Such prior techniques are characterized by the use of sources above 250 kilovolts energy and are workable in the examination of relatively thick or dense materials as compared with the examination of relatively thin materials or materials of low density with which the present invention is particularly concerned. It has been found that prior gamma radiography equipment employing radioactive isotope sources is practically operative in the examination of materials ranging between 3 gms./cm.$^2$ and 300 gms./cm.$^2$.

We have found that in general, radioactive isotopes of higher energy than 250 kilovolts are characterized by a preponderance of high energy gamma radiation as compared with a lower energy gamma radiation and accordingly when isotope sources of the type contemplated in prior gamma ray practice are used for the examination of small mass per unit of area, the preponderant amount of high energy gamma radiation accounts for a lack of contrast in a photographic plate. With very thin materials, beta radiation may also effect a fogging or ultimate lowering of contrast.

It is an object of the present invention to provide a method and apparatus for gamma ray radiography wherein a source having a preponderant amount of low energy gamma radiation as compared with the high energy gamma radiation radiated therefrom, is placed a predetermined distance from the object or specimen to be examined and a filter is placed therebetween to absorb the beta radiation and wherein a screen is positioned beyond the specimen a predetermined distance to receive the residue low energy gamma radiation and high energy gamma radiation from the specimen. The screen is of such character that it has a discriminating action in respect to the two types of gamma radiation specified, having a higher absorption and energy converting coefficient for the lower energy gamma radiation, thereby serving to preferentially detect the latter in conjunction with indicating means which may form a part of the screen or may be provided as a separate component as hereinafter described in more detail.

Other objects of the invention will be appreciated by a study of the following specification taken in conjunction with the accompanying drawings.

Figure 1:
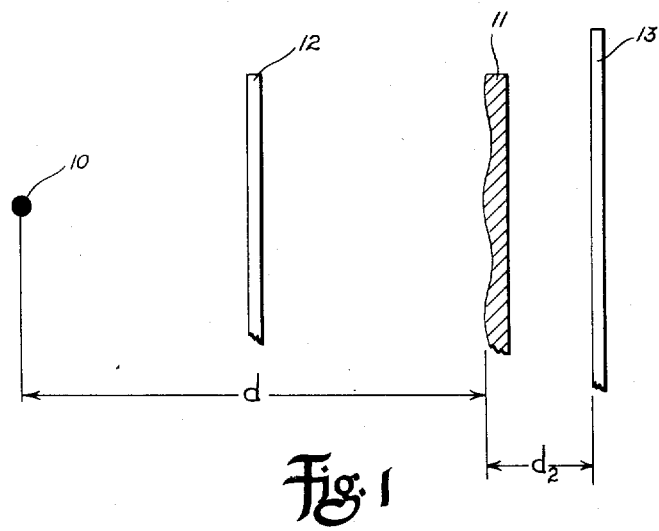
Figure 1 is a diagrammatic view of apparatus of the invention.

Before referring to the drawings, it is desirable to comment upon certain characteristics of the source material which may be employed in apparatus of the invention whereas prior gamma ray radiography techniques have in all cases required sources of an energy greater than 250 kilovolts. We have found that those sources which appear to be workable in apparatus of the invention are of lesser energy and are characterized by a preponderant amount of low energy gamma radiation as compared with the amount of high energy gamma radiation. Suitable source materials known at this time are shown along with their characteristics in Tables I and II.

ISOTOPES FOR LOW ENERGY RADIOGRAPHY

Table I

| Isotope | Half-Life | Beta Radiation, Millions of Electron Volts | Gamma Radiation, Millions of Electron Volts |
|---|---|---|---|
| Cerium-Praseodymium 144 | 290 day | 3.07<br>2.99<br>3.1<br>0.348<br>0.30 | 0.135.<br>0.22 (weak).<br>1.25 (weak). |
| Europium 155 | 1.7 year | 0.154 80%<br>0.243 20%<br>2.23 | 0.085 60%.<br>0.099 40%.<br>0.0844. |
| Terbium 160 | 72 day | 0.546<br>0.882<br>0.71<br>0.75 | 0.086.<br>0.195.<br>0.212.<br>0.297.<br>1.15. |
| Thulium 170 | 127 day | 0.886<br>0.970 | 0.084.<br>10% of beta radiation. |
| Osmium 191-3 | 16 day | 0.142 1.15<br>0.15 0.95<br>0.35 1.5<br>0.65 | 0.039 1.58.<br>0.127 1.17.<br>0.129. |
| Indium 114 | 50 day | 2.05 (97%) | 0.715.<br>0.548.<br>1.27.<br>0.192 (97%). |

ISOTOPES FOR LOW ENERGY RADIOGRAPHY

Table II

| Isotope | Source of Supply | Usefulness Pro | Usefulness Con |
|---|---|---|---|
| Cerium Praseodymium 144 | Fission Product (high yield) | Availability, half-life, high energy gamma (weak). | high energy beta, chemical source preparation. |
| Europium 155 | Fission Product (low yield) | half-life, low energy gamma radiation, low energy beta radiation. | availability, chemical source preparation. |
| Terbium 160 | Pile activation from natural terbium 55 barn cross-section. | Ease of source preparation | half-life. |
| Thulium 170 | Pile activation of natural thulium 100 barn cross-section. | easy source preparation—absence of high energy gamma. | high intensity of beta radiation. |
| Osmium 191-3 | Pile activation from natural osmium 3 barn cross-section. | | half-life, low yield. |
| Indium 114 | Pile activation from indium 113 (4%) natural element cross-section 2 barns. | | half-life, high energy beta radiation, low yield. |

The first two of the above noted sources are to be preferred because they are of the class of isotopes known as fission products, characterized by a high specific activity. In any case, practical sources for use according to the invention should have a specific activity preferably greater than about one thousand curies per gram. Sources of specific activity greater than ten thousand curies per gram are the most desirable.

In the apparatus and method of the invention, a source 10 of the character specified herein is separated a predetermined distance $d_1$ from a specimen 11 to be examined. A filter 12 is positioned between the source and specimen and is employed for the purpose of absorbing beta radiation from the source. The filter is made from a low atomic number low density material such as plastic and hydrocarbon materials, beryllium or lithium or their compounds, water and similar materials. The low density of the filter material ensures that the beta radiation is absorbed without the production of appreciable quantities of "bremstrahlen," the latter being secondary X-rays emitted by the action of beta rays upon a material, being of a kind detrimental to radiographic quality.

The filtered radiation comprising a certain proportion of "bremstrahlen" along with a relatively large amount of low energy gamma radiation and a smaller amount of high energy gamma radiation proceeds to the specimen 11. The higher energy gamma radiation passes through the specimen 11 with negligible loss, whereas the specimen will effect an appreciable absorption of low energy gamma radition. With very thin materials or materials of very low effective density, the differential absorption of high energy and low energy gamma radiation will be small. On the other hand, with very thick or high density materials, the low energy gamma radiation may be substantially absorbed whereas the high energy gamma radiation may still be relatively unaffected.

Accordingly, the apparatus and method of the invention is applicable to the measurement of materials ranging between the mass-area of about 0.10 gm./cm.$^2$ to about 30 gm./cm.$^2$. The non-absorbed radiation coming from the specimen is passed through a radiation sensitive screen 13. The screen 13 may be in one of a number of forms capable either alone or in combination with various classes of indicating equipment, of providing an image or record which may be examined. There are three main classes of screen which may be employed.

A photographic class of screen will comprise a combination of a discriminating screen element formed by a film emulsion carrier or a constituent of the film emulsion itself such as a compound of lead. The silver in the photographic emulsion itself has a certain discriminating effect also, thus having a higher absorption and energy conversion co-efficient for low energy gamma radiation than for high energy gamma radiation. Accordingly, the screen of the invention may in this case comprise a part of the film emulsion, the emulsion support, or may be provided in a separate sheet about a photographic plate. Some photographic emulsions such as those used in some classes of X-ray work today may have sufficient discriminating action to require no special attention to the provision of a separate screen. In nearly all cases, however, an enhanced discriminating effect will be desired and may be accomplished by the provision of a separate screen device.

Another class of screen device comprises a support substantially transparent to radiation from the specimen and carrying a fluorescent or phosphorescent material of well known identity adapted to release light energy upon bombardment by low energy gamma radiation. In this case, a separate discriminating material may be combined with the radiation sensitive screen material itself or may be inherent in the latter, having regard to desired discriminating effect of some materials of the type contemplated herein such as Willimite.

In a third case, the image of low energy gamma radiation is converted to electron energy, the latter activating a device such as a cathode ray tube. Thus, the screen in such case may comprise an iconoscope form of energy discriminator and converter coupled through the usual amplifiers with a driving circuit for a cathode ray tube and wherein a suitable scanning system is used.

Devices embodying screens of the first class discussed are illustrated in Figures 2 to 5.

Figure 2:
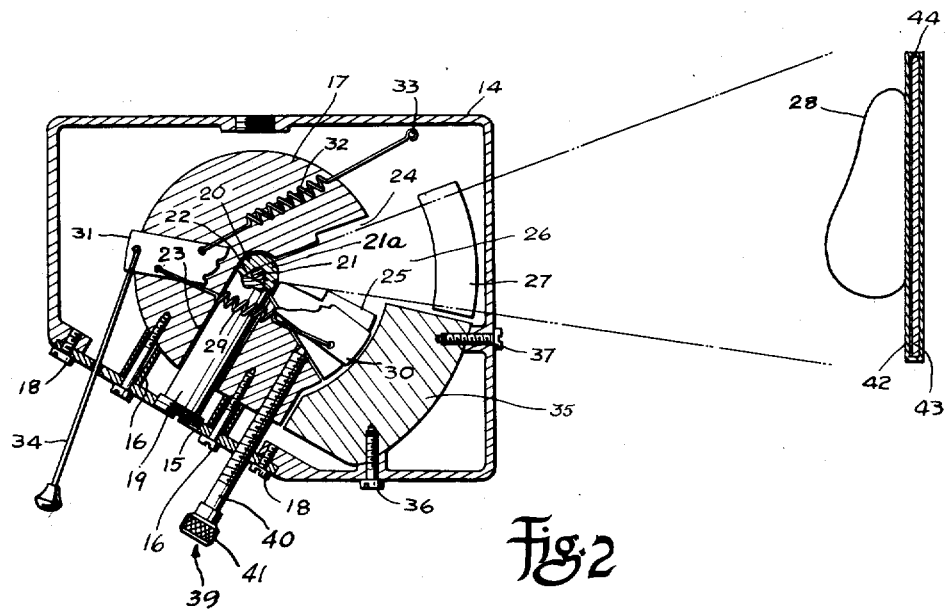
Figure 2 is a sectional view of one form of apparatus according to the invention illustrating a shutter mechanism for the source disposed in the open position.
Figure 3:
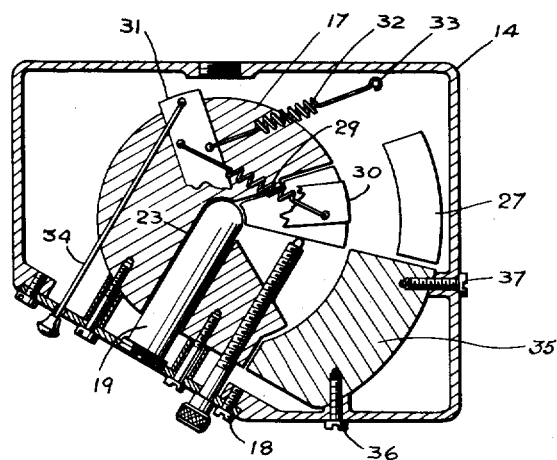
Figure 3 is a sectional view of the device of Figure 2 illustrating the closed position of the shutter mechanism.

In Figures 2 and 3, apparatus enclosing a mechanical shuttering arrangement is illustrated and embodies a housing 14 carrying therewithin a gamma ray shield having a cover 15 having posts 16 extending therefrom interiorly to support a gamma ray shield body 17 preferably formed of a dense tungsten alloy but which may also be formed of lead or antimonial lead. The cover 15 is fastened to the housing 14 by means of suitable bolts 18 and also carries a source cartridge 19 housing at its free extremity 20, a source material 21 having a characteristic of a preponderant amount of low energy gamma radiation as compared with the amount of high energy gamma radiation emitted therefrom. The physical size of the source 21 is kept at a minimum for purposes of desired definition in the examination of a specimen. The physical size of one cubic millimeter is capable of accomplishment with sources of the type discussed herein. As indicated, the source 21, contained in a plastic ball 21a, is supported in the cartridge by a lead or other suitable filler 22 and by means of a socket 23, is located centrally within the shielding body 17. A collimated opening 24 is provided in the shield body 17 and a shutter element 25 swingable on an axis preferably aligned with the source 21 as shown, is pivotally mounted on said axis and movable between the open position illustrated in Figure 2 and the closed position illustrated in Figure 3, while the shutter element 25 is in the open position, radiation from the source 21 passes through the effective aperture 26 and the filter 27 exteriorly to a specimen 28 will support it at a predetermined distance from the source 21.

In the form shown, the filter 27 may be formed of plastic such as lucite, about ⅜ of an inch thick, supported within the housing 14 by any suitable means (not shown). The shutter element 25 is held in the open position by means of the spring 29 extending between the shutter element mounting arm 30 and the shutter actuating arm 31, the latter also being pivoted on the axis aligned with the source 21. The shutter actuating arm is biased by means of spring 32 to the housing as at 33 so that upon release of the shutter actuating rod 34 extending exteriorly of the housing cover 15 as illustrated, the shutter actuating arm will be moved clockwise to the position illustrated in Figure 3 whereby the spring 29 will be disposed in an over-center position on the opposite side of the axis mounting the arm 30, thereby causing the shutter element 25 to swing immediately counter-clockwise to the closed position. A gamma radiation shield element 35 is supported in the housing 14 by means of suitable screws 36 and 37 and serves to extend over the uncovered portion of the opening 24 in the shield body 17. A shutter locking screw 39 is adapted to be moved to the position illustrated in Figure 3 to maintain the shutter element 25 in the closed position shown except when the apparatus is being used. Preferably, a portion 40 of the screw 39 near the head 41 thereof is coloured distinctively red so that when the screw is withdrawn to allow operation of the shutter, the warning colour serves as an indicator that the shutter is actuable.

The film holder 42 carrying the suitable film 43 is disposed immediately next to the specimen and receives unabsorbed radiation from the latter. A screen element 44 formed of lead foil extends over the emulsion surface of the film 43 and serves in a discriminating function in that its absorption co-efficient for low energy gamma radiation is higher than for high energy gamma radiation and the lead serves to convert the absorbed energy to electron energy effecting activation of the emulsion of the film 43. As before mentioned, the emulsion itself, by reason of the inclusion of silver salts, effectively constitutes a screen, according to the invention and preferentially converts the low energy gamma radiation to electron energy.

Figure 4:
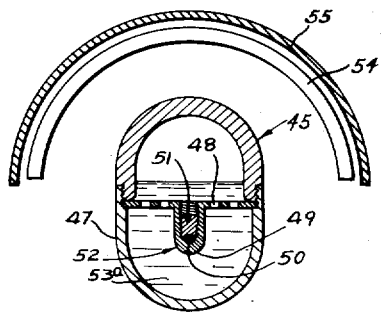
Figure 4 illustrates a sectional view of a modified form of apparatus according to the invention showing a liquid shutter mechanism wherein the shutter is closed.
Figure 5:
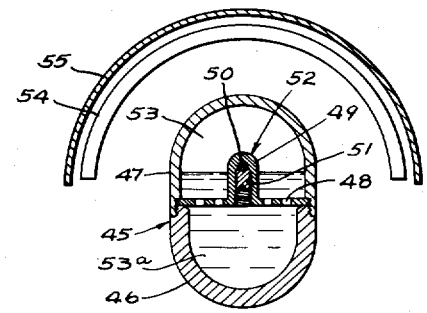
Figure 5 illustrates a different positioning of the device of Figure 4 to accomplish an effective opening of the liquid shutter means.

A modified form of apparatus according to the invention incorporating a fluid shutter means, is illustrated in Figures 4 and 5. In this form, a source apparatus comprises a substantially spherical housing 45 formed of thread mated halves 46 and 47 carrying therewithin a perforated support 48 centrally located hollow projection 49 carrying therewithin a source 50 supported by a screw threaded support 51 therewithin. A source head 52 thus formed is positioned a sufficient distance from the centroid of the chamber 53 defined by the housing parts that shutter action may be provided by filling the chamber more than half way with a gamma shielding material 53a such as mercury and filling the remainder of the chamber with suitable liquid hydrocarbon such as a lubricating oil to serve as a beta ray filter. If desired, the remainder of the chamber may contain air rather than oil, in which case a plastic filter may be formed about the spherical housing in such manner that it corresponds in this action to the filter 27 in the apparatus of Figure 2.

As illustrated, the specimen 54 to be examined may be of semi-circular form, in which case a lead foil sheath 55 may be laid thereover and the housing 45 inverted as illustrated in Figure 5 for a predetermined period of time to cause the liquid gamma ray filter to seek a position within the housing out of the path of radiation from the source to the specimen.

At the end of the desired exposure period, the housing is rotated to the position illustrated in Figure 4 whereby the gamma shielding liquid is disposed between the source and the specimen. Observe that in this position, the mercury or other suitable liquid is disposed such that a source 50 is located substantially at the centroid of the mass of liquid.

It will be apparent from the foregoing that many modifications of the method and apparatus disclosed herein may be practiced by skilled persons without departing from the spirit of the invention set forth. Accordingly it is desired that the disclosure herein in respect to preferred constructions set forth in the drawings should not be construed in any limiting sense other than that indicated by the scope of the following claims.

What we claim as our invention is:

1. Gamma ray radiography apparatus adapted for the examination of specimens of a mass between about 0.1 and 30 gm./cm.$^2$, comprising in combination: a radioactive isotope having a greater amount of low energy gamma radiation than high energy gamma radiation, a low energy gamma radiation sensitive screen including means for converting the energy of said radiation to a visible image preferential to the conversion of high energy gamma radiation to a visible image, a beta radiation filter of a low atomic number low density material disposed between said source and said screen, and shutter means movable between said source and said screen.

2. Gamma ray radiography apparatus, comprising in combination: a supporting body formed of a gamma ray shielding material, a cartridge containing a radio-active isotope having a greater amount of low energy gamma radiation than high energy gamma radiation and insertable in said body to position said isotope as a source substantially centrally within said body, an opening in said body extending substantially from the center thereof outwardly to form a passage for radiation from the body, a shutter element mounted in said opening composed of a gamma ray shielding material and adapted to cover substantially half of the opening, a gamma radiation shield element disposed exteriorly of said body and extending over a portion of said opening to define a collimating aperture in conjunction with a portion of the opening of said body and adapted to absorb gamma radiation from said body when the shutter is in the closed position over said aperture, and means for articulating said shutter element.

3. Gamma ray radiography apparatus, comprising in combination: a supporting body formed of a gamma ray shielding material, a cartridge containing a radio-active isotope having a greater amount of low energy gamma radiation than high energy gamma radiation and insertable in said body to position said isotope as a source substantially centrally within said body, an opening in said body extending substantially from the center thereof outwardly to form a passage for radiation from the body, a shutter element mounted in said opening composed of a gamma ray shielding material and adapted to cover substantially half of the opening, a gamma radiation shield element disposed exteriorly of said body and extending over a portion of said opening to define a collimating aperture in conjunction with a portion of the opening of said body and adapted to absorb gamma radiation from said body when the shutter is in the closed position over said aperture, means for articulating said shutter element, a housing extending about said body, said shield and shutter elements, and a cover for said housing including means for mounting said cartridge.

4. Gamma ray radiography apparatus, comprising in combination: a supporting body formed of a gamma ray shielding material, a cartridge containing a radio-active isotope having a greater amount of low energy gamma radiation than high energy gamma radiation and insertable in said body to position said isotope as a source substantially centrally within said body, an opening in said body extending substantially from the center thereof outwardly to form a passage for radiation from the body, a shutter element mounted in said opening composed of a gamma ray shielding material and adapted to cover substantially half of the opening, a gamma radiation shield element disposed exteriorly of said body and extending over a portion of said opening to define a collimating aperture in conjunction with a portion of the opening of said body and adapted to absorb gamma radiation from said body when the shutter is in the closed position over said aperture, means for articulating said shutter element, and a beta radiation filter disposed in the path of radiation from said aperture when the shutter is in the open position.

5. Gamma ray radiography apparatus, comprising in combination: a supporting body formed of a gamma ray shielding material, a cartridge containing a radio-active isotope having a greater amount of low energy gamma radiation than high energy gamma radiation and insertable in said body to position said isotope as a source substantially centrally within said body, an opening in said body extending substantially from the center thereof outwardly to form a passage for radiation from the body, a shutter element mounted in said opening composed of a gamma ray shielding material and adapted to cover substantially half of the opening, a gamma radiation shield element disposed exteriorly of said body and extending over a portion of said opening to define a collimating aperture in conjunction with a portion of the opening of said body and adapted to absorb gamma radiation from said body when the shutter is in the closed position over said aperture, means for articulating said shutter element, a housing extending about said body, said shield and shutter elements, a cover for said housing including means for mounting said cartridge and a beta radiation filter supported within said housing in the path of radiation from said aperture when the shutter is in the open position.

6. Gamma ray radiography apparatus, comprising in combination: a supporting body formed of a gamma ray shielding material, a cartridge containing a radio-active isotope having a greater amount of low energy gamma radiation than high energy gamma radiation and insertable in said body to position said isotope as a source substantially centrally within said body, an opening in said body extending substantially from the center thereof outwardly to form a passage for radiation from the body, a shutter element mounted in said opening composed of a gamma ray shielding material and adapted to cover substantially half of the opening, a gamma radiation shield element disposed exteriorly of said body and extending over a portion of said opening to define a collimating aperture in conjunction with a portion of the opening of said body and adapted to absorb gamma radiation from said body when the shutter is in the closed position over said aperture, means for articulating said shutter element, a housing extending about said body, said shield and shutter elements, a cover for said housing including means for mounting said cartridge and a locking screw for fixing the shutter in the closed position.

7. Gamma ray radiography apparatus comprising in combination: a housing having a perforate diaphragm dividing the interior of the housing into two chambers but allowing communication between the latter, a gamma radiation shield in the form of a liquid in one of said chambers, a projection on said diaphragm adapted to project into said liquid when the housing is positioned to position the projection in depending position, a radio-active source material disposed in said projection to be immersed in said fluid when the projection is depending, said fluid providing effectively a shutter for said source when the housing is inverted to allow the fluid to flow into the other chamber permitting the source and at least a portion of said projection to project above the level of said liquid in said housing.

8. Apparatus as claimed in claim 7 and a beta radiation filtering fluid occupying that portion of the interior of the housing not occupied by the gamma radiation shield fluid.

9. Apparatus as claimed in claim 7 and a beta radiation shield material forming a portion of said housing defining the chamber thereof into which said projection extends.

10. Gamma ray radiography apparatus, comprising in combination: a supporting body formed of a gamma ray shielding material; a cartridge containing a radio-active isotope having a greater amount of low energy gamma radiation than high energy gamma radiation and insertable in said body to position said isotope as a source substantially centrally within said body; an opening in said body extending substantially from the center thereof outwardly to form a passage for radiation from the body; a shutter element mounted in said opening composed of a gamma ray shielding material and adapted to cover substantially half of the opening; a gamma radiation shield element extending over a portion of said opening and adapted to absorb gamma radiation from said body when the shutter is in the closed position over said aperture; and means for articulating said shutter element.

References Cited in the file of this patent
UNITED STATES PATENTS

| Number | Name | Date |
|---|---|---|
| 1,991,934 | McCray | Feb. 19, 1935 |
| 2,477,648 | Piggot et al. | Aug. 2, 1949 |
| 2,479,882 | Wallhausen | Aug. 23, 1949 |
| 2,483,991 | Woolan | Oct. 4, 1949 |
| 2,541,599 | Morrison | Feb. 13, 1951 |
| 2,551,491 | Gilks | May 1, 1951 |
| 2,580,360 | Morrison | Dec. 25, 1951 |
| 2,622,209 | Hjulion | Dec. 16, 1952 |
| 2,642,541 | Young | June 16, 1953 |